(12) United States Patent
Reynolds et al.

(10) Patent No.: US 12,147,821 B2
(45) Date of Patent: Nov. 19, 2024

(54) SELECTIVELY SWITCHING CLIENT DEVICE REMOTE CONTROL OF HOST DEVICE BETWEEN HARDWARE- AND SOFTWARE-BASED REMOTE CONTROL MODES

(71) Applicant: Hewlett-Packard Development Company, L.P., Spring, TX (US)

(72) Inventors: Douglas Reynolds, Fort Collins, CO (US); Peter Seiler, Fort Collins, CO (US); Eric John Gressman, Fort Collins, CO (US); Byron A. Alcorn, Fort Collins, CO (US); J. Michael Stahl, Fort Collins, CO (US); Gregory Mark Hughes, Fort Collins, CO (US); Patrick S. Anderson, Fort Collins, CO (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 18/007,351

(22) PCT Filed: Aug. 28, 2020

(86) PCT No.: PCT/US2020/048351
§ 371 (c)(1),
(2) Date: Jan. 30, 2023

(87) PCT Pub. No.: WO2022/046065
PCT Pub. Date: Mar. 3, 2022

(65) Prior Publication Data
US 2023/0281028 A1 Sep. 7, 2023

(51) Int. Cl.
| | |
|---|---|
| G06F 9/451 | (2018.01) |
| G06F 3/023 | (2006.01) |
| G06F 3/14 | (2006.01) |
| G06F 13/20 | (2006.01) |

(52) U.S. Cl.
CPC .............. *G06F 9/452* (2018.02); *G06F 3/023* (2013.01); *G06F 3/1454* (2013.01); *G06F 13/20* (2013.01); *G06F 2213/40* (2013.01)

(58) Field of Classification Search
CPC ........ G06F 3/023; G06F 9/452; G06F 3/1454; G06F 13/20
See application file for complete search history.

(56) References Cited

U.S. PATENT DOCUMENTS

| | | | |
|---|---|---|---|
| 7,895,521 B2 | 2/2011 | Bhogal et al. | |
| 8,370,856 B2 | 2/2013 | Peterson | |
| 8,650,267 B2 | 2/2014 | Luciani, Jr. et al. | |
| 9,251,347 B2 | 2/2016 | Bulusu et al. | |
| 9,886,295 B2 * | 2/2018 | Mo ..................... | G06F 9/45541 |
| 2002/0111999 A1 | 8/2002 | Andersson | |
| 2005/0060529 A1 | 3/2005 | Chen | |

(Continued)

*Primary Examiner* — Abbas I Abdulselam
(74) *Attorney, Agent, or Firm* — Knobbe, Martens, Olson & Bear, LLP

(57) ABSTRACT

A host device has a hardware-based remote control mode and a softwarebased remote control mode. The availability of each of the hardware- and software-based remote control modes is monitored. Client device remote control of the host device is selectively switched between the hardware- and softwarebased remote control modes, based on the monitored availability of each remote control mode.

17 Claims, 13 Drawing Sheets

(56) References Cited

U.S. PATENT DOCUMENTS

| | | |
|---|---|---|
| 2005/0125648 A1 | 6/2005 | Luciani et al. |
| 2006/0285514 A1 | 12/2006 | Hoerl et al. |
| 2014/0258533 A1 | 9/2014 | Antony |
| 2016/0099948 A1 | 4/2016 | Ott et al. |
| 2021/0006615 A1* | 1/2021 | Lv .................. H04L 67/025 |

* cited by examiner

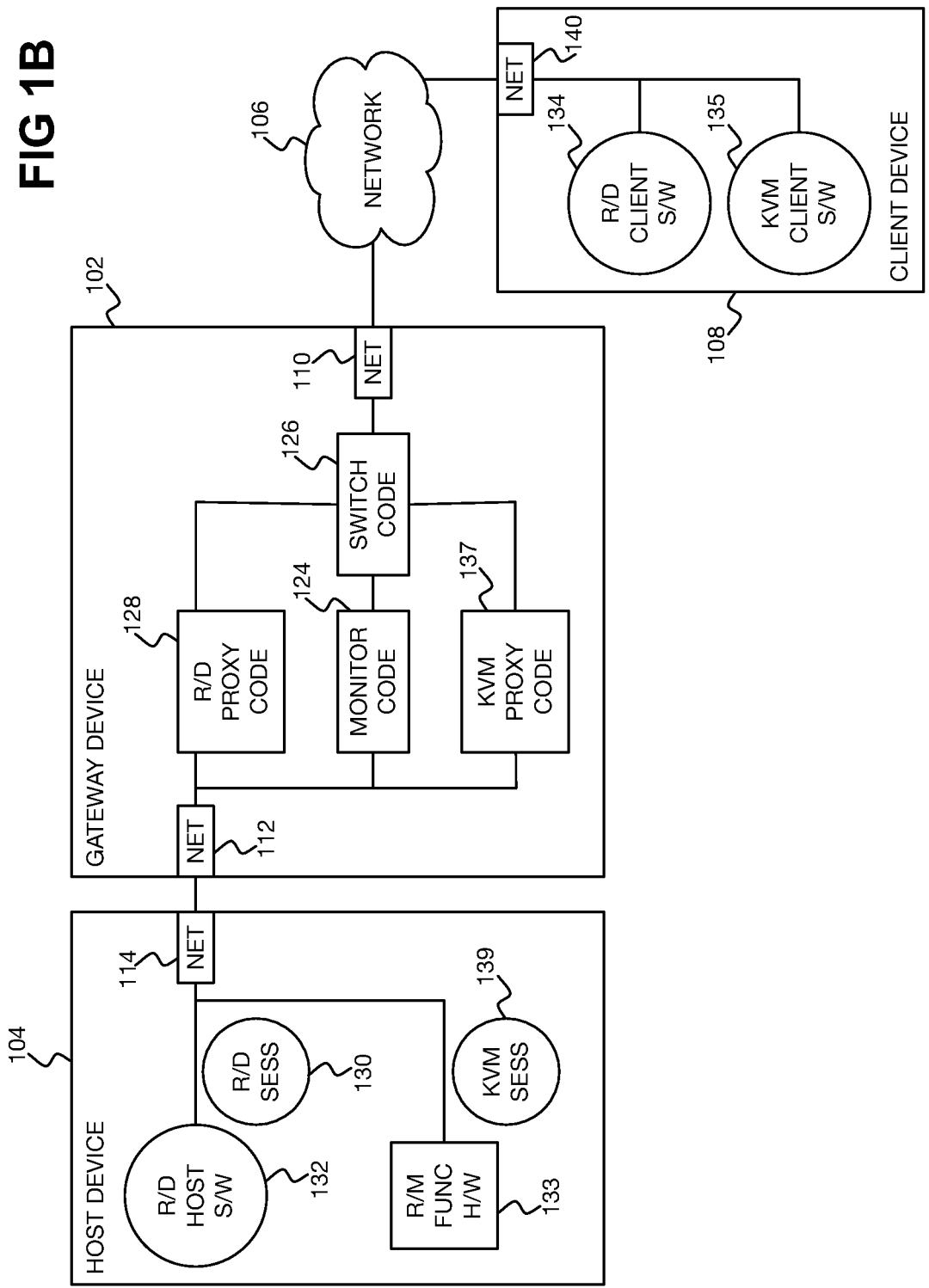

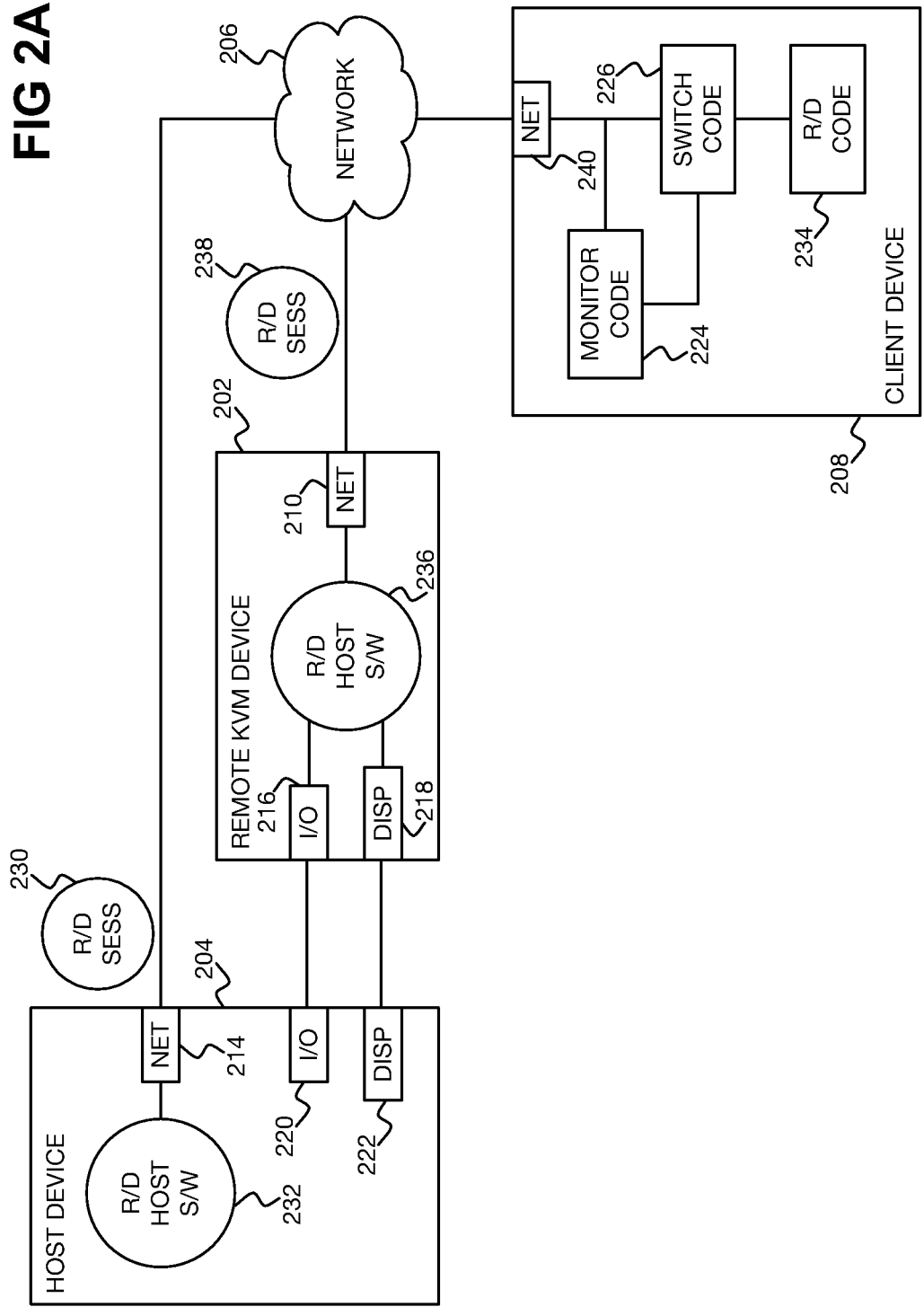

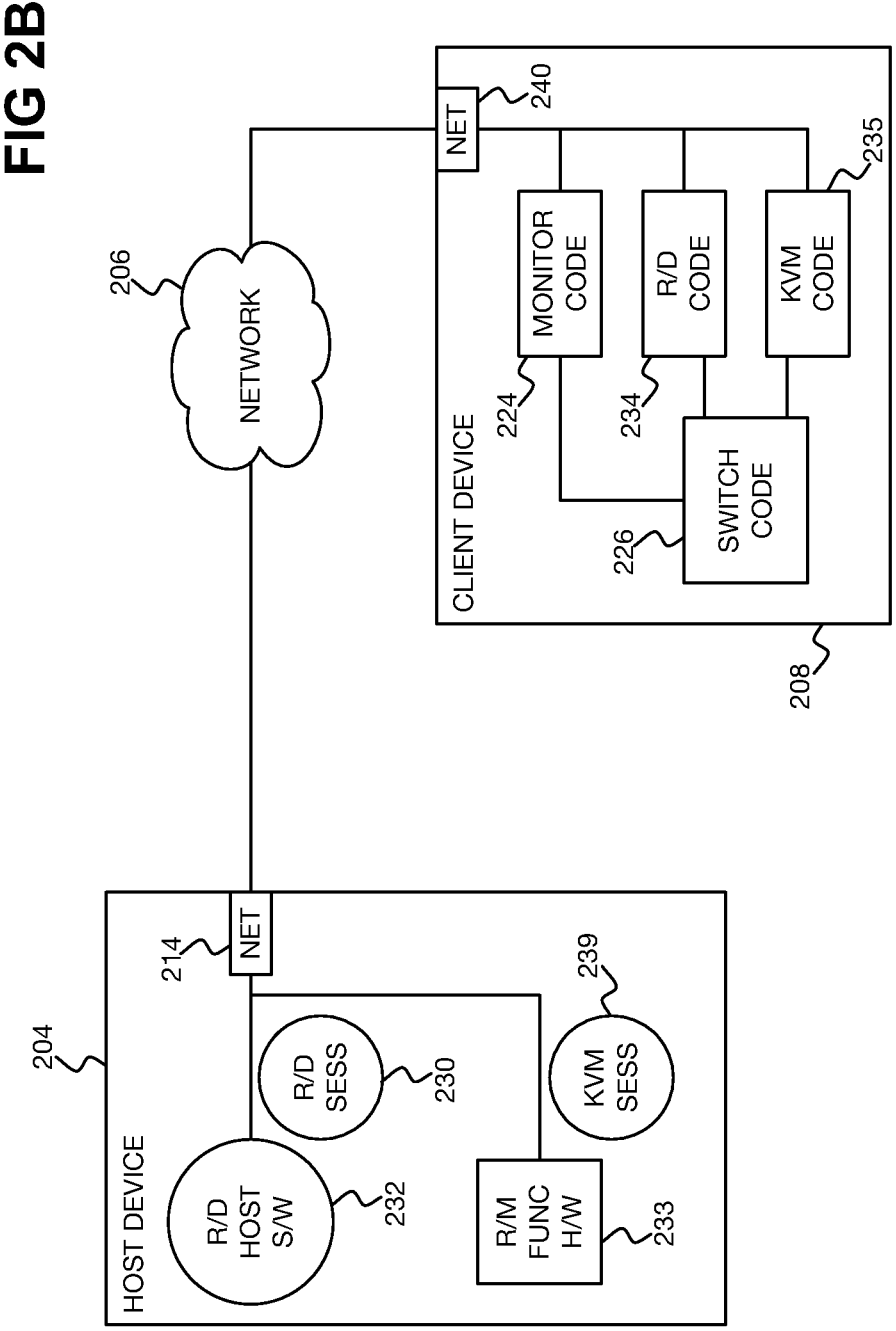

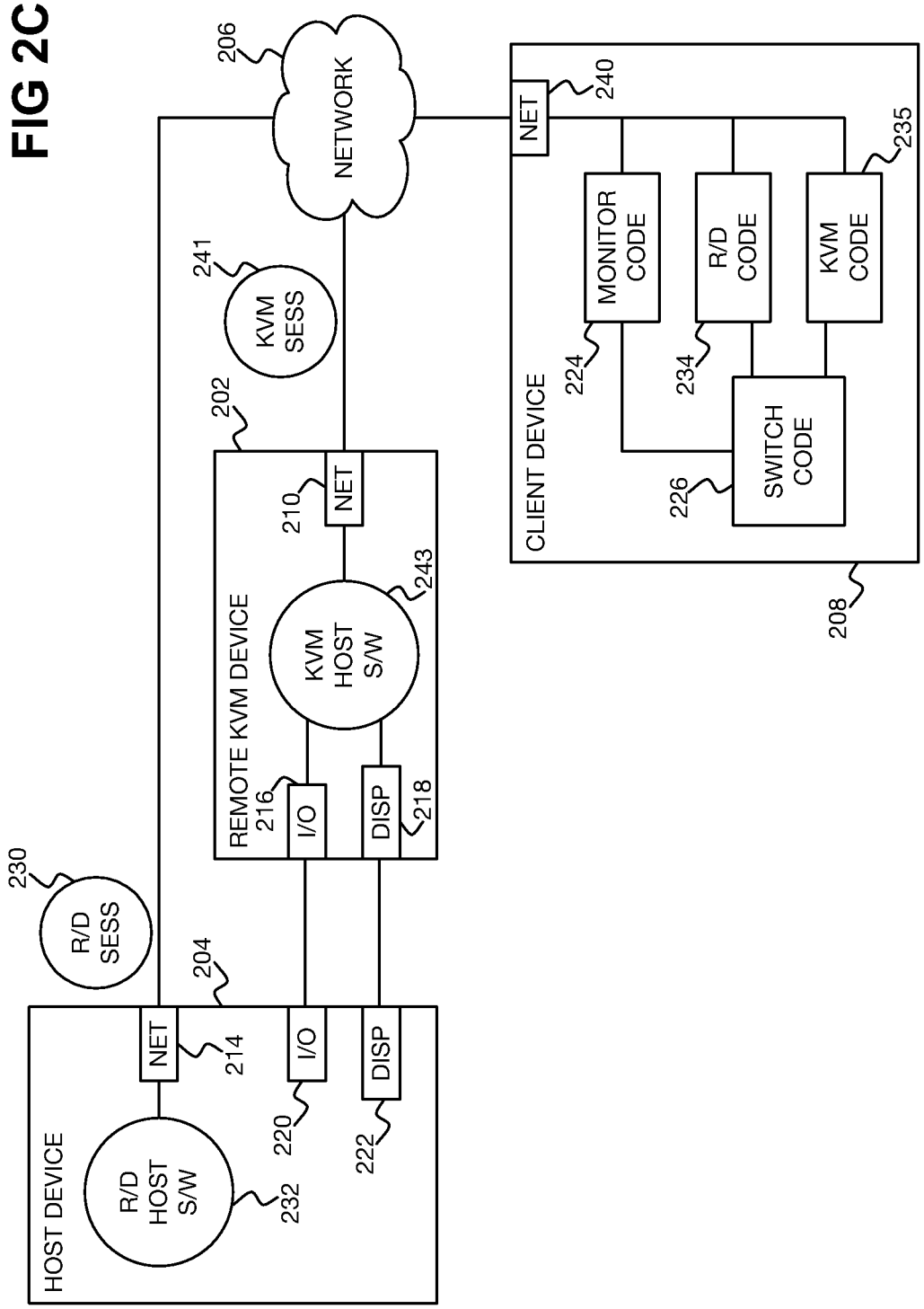

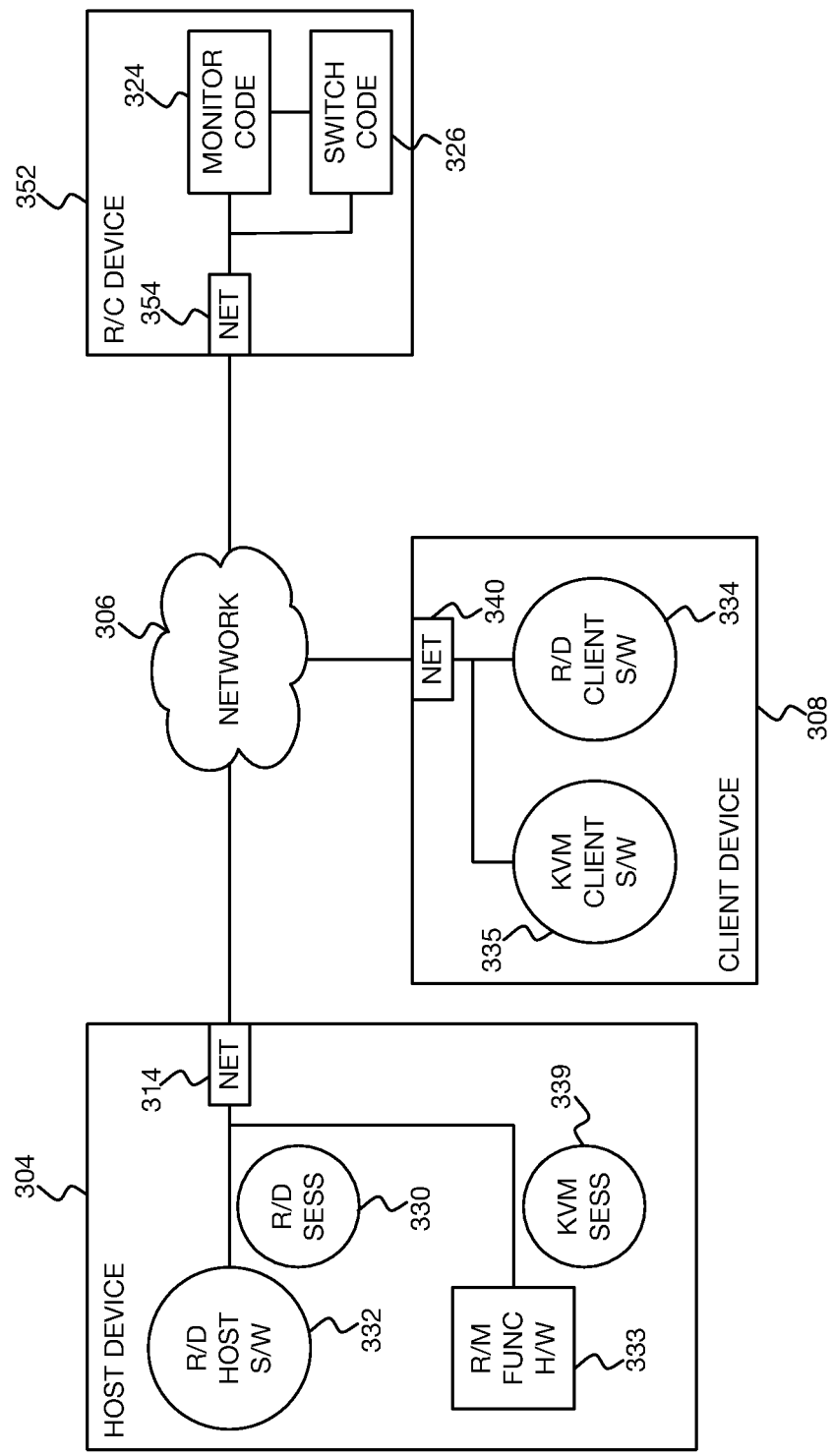

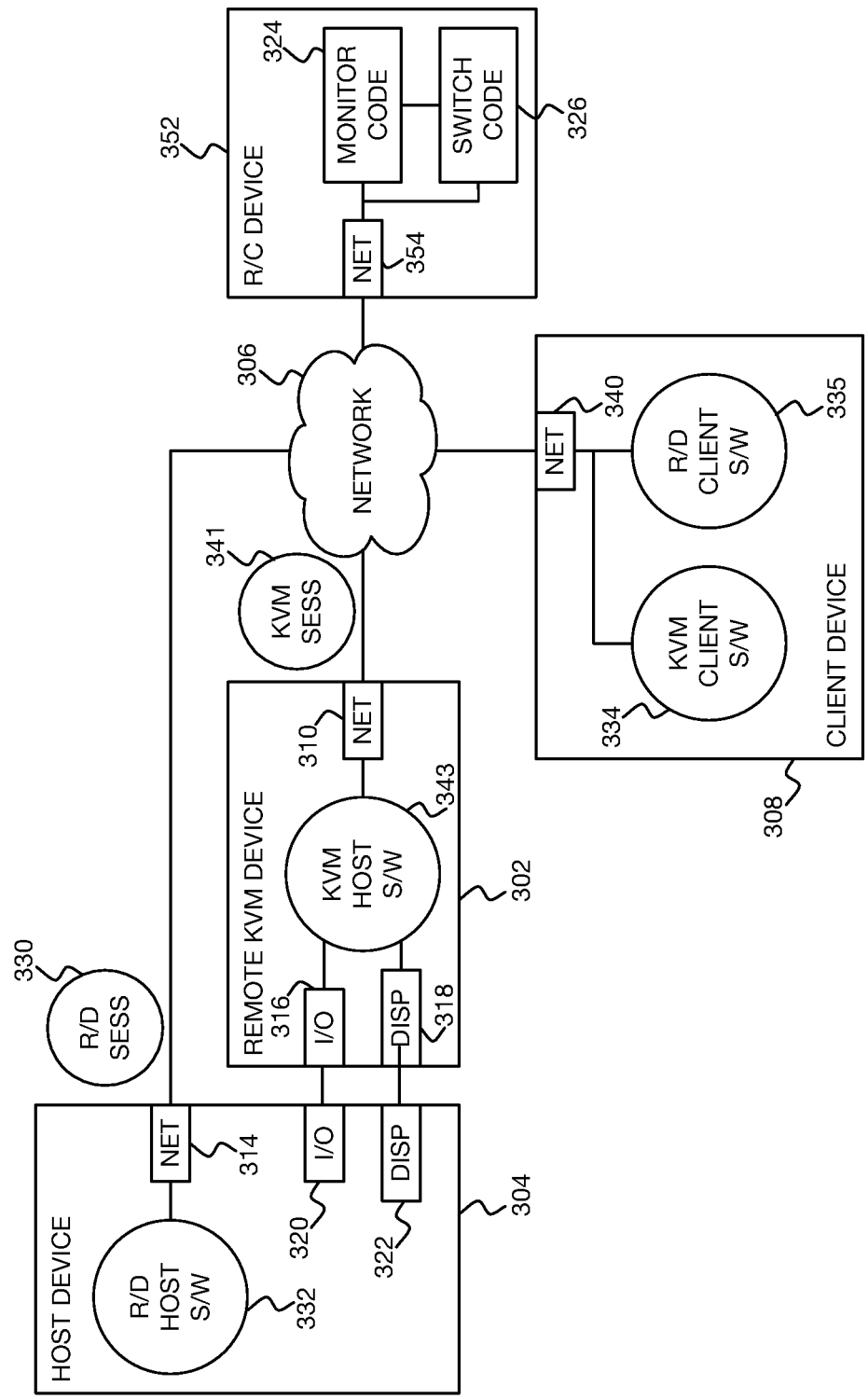

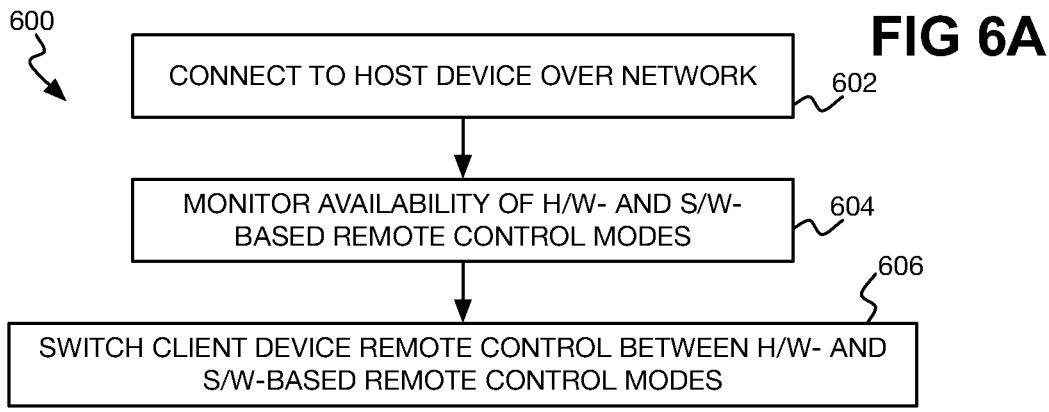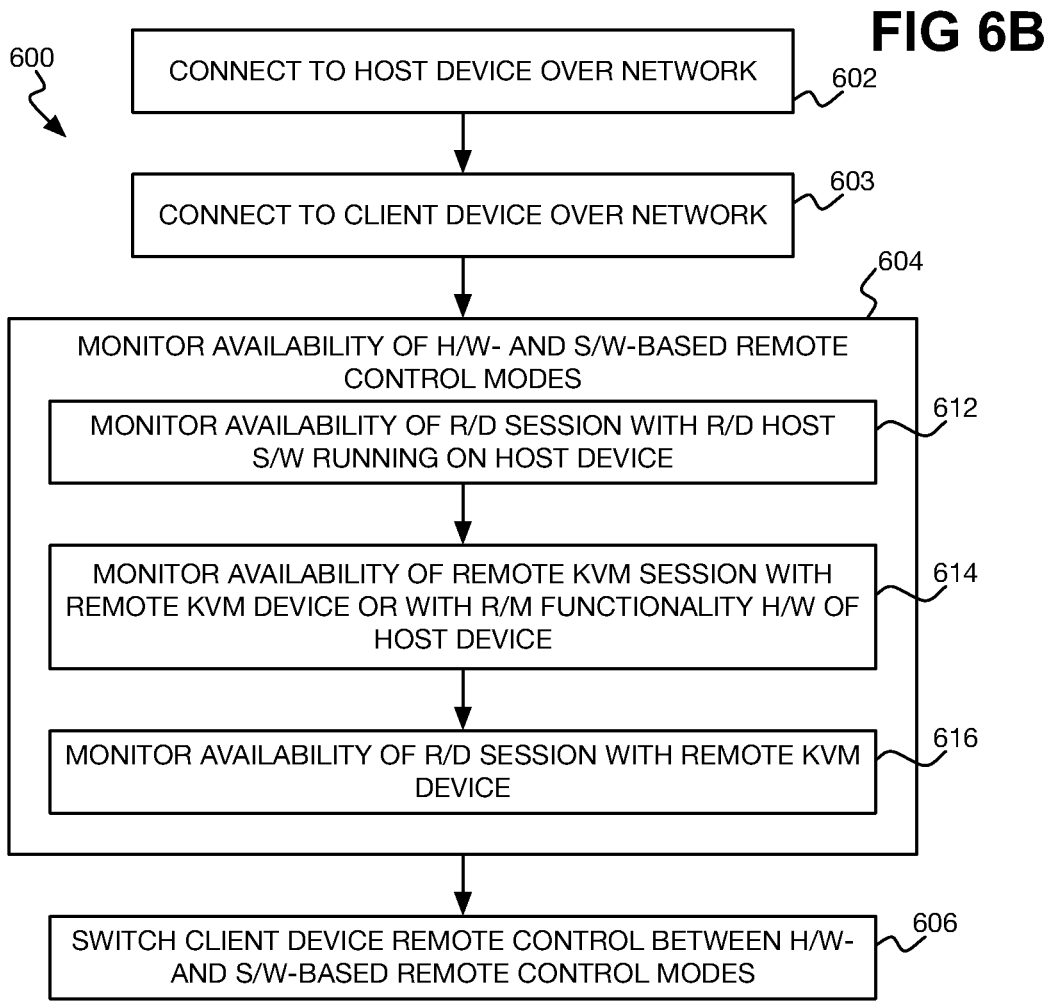

SELECTIVELY SWITCHING CLIENT DEVICE REMOTE CONTROL OF HOST DEVICE BETWEEN HARDWARE- AND SOFTWARE-BASED REMOTE CONTROL MODES

BACKGROUND

A computing device, such as a computer like a server, desktop, laptop, or notebook computer may be used in-person or remotely over a network. When a computer is used in-person, a user may directly interact with input devices that are part of or directly connected to the computer, without any intervening network connection between the computer and the input devices. The user may likewise directly view display devices that are part of or directly connected to the computer, without any intervening network connected between the computer and the display devices. When a computer is used remotely, a user may access the computer over a network, using another computing device, such as a different computer or other type of computing device like a smartphone, tablet computing device, and so on.

BRIEF DESCRIPTION OF THE DRAWINGS

FIGS. 1A, 1B, and 1C are diagrams of different examples of a gateway device that can selectively switch client device remote control of a host device between hardware-based and software-based remote control modes of the host device.

FIGS. 2A, 2B, and 2C are diagrams of different examples of a client device that can selectively switch client device remote control of a host device between hardware-based and software-based remote control modes of the host device.

FIGS. 3A, 3B, and 3C are diagrams of different examples of a remote control device that can selectively switch client device remote control of a host device between hardware-based and software-based remote control modes of the host device.

FIG. 6A is a flowchart of an example method that is performed by a device to switch client device remote control of a host device between hardware-based and software-based remote control modes of the host device.

FIG. 6B is a flowchart of an example method that is performed by a remote control device to switch client device remote control of a host device between hardware-based and software-based remote control modes of the host device.

DETAILED DESCRIPTION

Figure 1A:
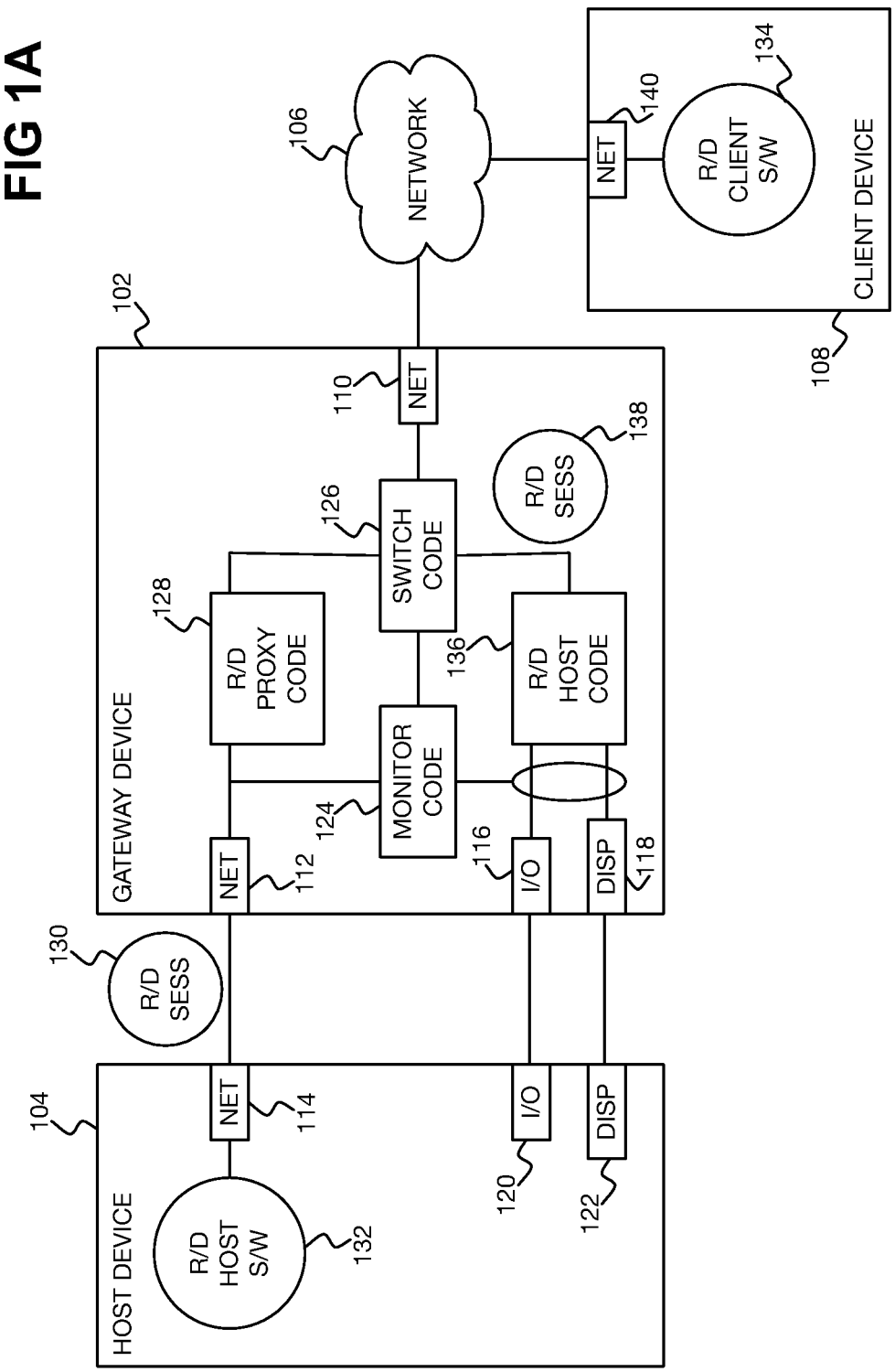

As noted in the background, a computing device like a computer can be used in-person or remotely over a network. Such a host device may have both hardware-based and software-based remote control modes. In a software-based remote control mode, the host device may run remote desktop host software once the operating system of the device has booted. This remote control mode is software-based in that the remote desktop host software runs within or on the host device's operating system, and is executed by the primary or main processor or processors of the device.

A user remotely controls the host device in such a software-based remote control mode by running corresponding remote desktop client software on another computing device, such as another computer or other computing device. The remote desktop client software on such a client device establishes a remote desktop session with the remote desktop host software running on the host device, which provides this session. The host device's desktop environment can therefore be displayed on the display device of the client device, and controlled via input devices of the client device.

In a hardware-based remote control mode, there may or may not be remote desktop host software. Remote control may not be predicated on the operating system of the host device having first booted. That is, if the hardware-based remote control mode does employ remote desktop host software, such software does not run within or on the host device's operating system. Further, a hardware-based remote control mode may not use the primary or main processor or processors of the host device, in that such a processor or processors do not provide for remote control of the device in this mode.

For example, a keyboard-video-mouse (KVM) device that connects to input/output (I/O) and display interfaces of a host device may provide remote control of the host device in a hardware-based remote control mode. The KVM device also communicatively connects to a client device over a network. The KVM device permits KVM client software running on the client device to communicate via the I/O and display interfaces of the host device as if the client device were input and display devices directly connected to these interfaces, within a remote KVM session in accordance with a KVM over Internet Protocol (IP) or KVM over local-area network (LAN) technique.

As another example of a hardware-based remote control mode, a host device may have remote management functionality hardware that includes a service or management processor different than the primary or main processor or processors of the device. This hardware can execute code outside the context of the operating system that runs on the primary or main processors, and even if the operating system has not booted. The hardware can similar to an external KVM device connected to the host device provide a remote KVM session by which KVM client software on a client device can communicate with the host device as if it were input and display devices directly connected to the I/O and display interfaces of the host device.

Software-based remote control of a host device generally provides for a better user experience at a client than hardware-based remote control does. For instance, certain features of the host device, including hardware-accelerated graphics as well as display device configurability, may not be available via hardware-based remote control. However, software-based remote control is not available until the operating system of the host device boots, and may not be available if a user is not logged into the operating system or the operating system has entered in a low-power state. By comparison, hardware-based remote control may be possible prior to operating system boot, as well as when a user is not logged into the operating system or the operating system has entered a low-power state.

Techniques described herein provide for selectively switching client device remote control of a host device between hardware-based and software-based remote control modes, based on monitoring of the availability of each remote control mode. Remote control of the host device at the client device may seamlessly automatically switch between hardware- and software-based remote control modes, without manual intervention or triggering by a user of the client device. As one example, remote control may occur in the hardware-based remote control mode when the software-based remote control mode is unavailable. Once the software-based remote control mode becomes available, remote control of the host device may occur in the software-based remote control mode.

Figure 1C:
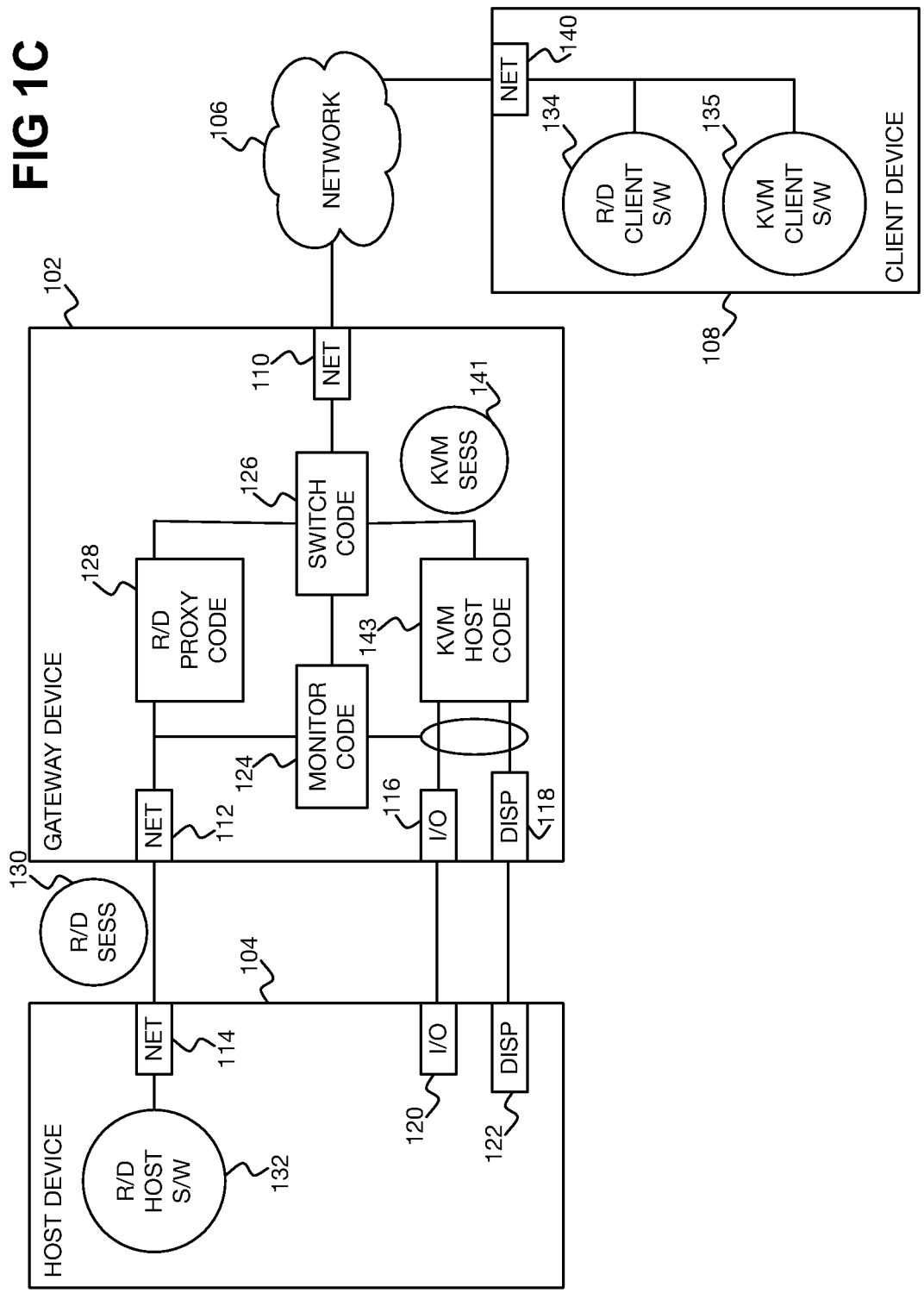

FIGS. 1A, 1B, and 1C show different examples of a gateway device 102 that can selectively switch remote control of a host device 104 by a client device 108 over a network 106 between hardware-based and software-based remote control modes of the host device 104. The host device 104 may be a computer like a server, desktop, or laptop computer, or another type of computing device. The client device 108 may likewise be a computer, or another type of computing device such as a smartphone, tablet or other type of computing device. The network 106 can be or include the Internet, an extranet, an intranet, a LAN, a wide-area network (WAN), or another type of network.

The gateway device 102 may be in the form of a dongle or other discrete device that directly connects to the host device 104. The gateway device 102 includes a physical or hardware network interface 110 that communicatively connects to the network 106, such as via an intervening network device or devices like firewalls, routers, and so on. The client device 108 likewise has a physical or hardware network interface 140 that communicatively connects to the network 106, such as via the same or different intervening network device or devices as the gateway device 102.

The gateway device 102 includes another physical or hardware network interface 112 that connects to a corresponding physical or hardware network interface 114 of the host device 104. The network interface 112 of the gateway device 102 may be directly connected to the network interface 114 of the host device 104 without any intervening device or devices. The network interface 112 of the gateway device 102 is thus a host-facing network interface in that it connects to the host device 104, whereas the network interface 110 of the gateway device 102 is a network-facing network interface in that it communicatively connects to the network 106.

In FIG. 1A, the gateway device 102 includes a physical or hardware I/O interface 116 that is communicatively connected to an I/O interface 120 of the host device 104, such as directly without any intervening devices. The I/O interfaces 116 and 120 may each be one or multiple Universal Serial Bus (USB) ports, one or multiple Personal System/2 (PS/2) ports, or another type of I/O interface. The I/O interface 120 of the host device 104 is receptive to connection of input devices such as keyboards and pointing devices (e.g., mice, touchpads, and so on) by which the host device 104 can be directly provided input. The gateway device 102 emulates such input devices, and thus acts as virtual such input devices, via the I/O interface 116.

The gateway device 102 may also include a storage and expose the storage to the host device 104 as a removable storage device on the I/O interface 117. For instance, the storage may be exposed as a USB removable storage device to the host device 104. The host device 104 may use the storage as a local storage device. Because the storage is exposed on just the I/O interface 116 and not exposed on the network interface 110, the storage can be used by the host device 104 in a secure manner.

The gateway device 102 includes a physical or hardware display interface 118 as well, which is communicatively connected to a display interface 122 of the host device 104, such as directly without any intervening devices. The display interfaces 118 and 122 may each be one or multiple High-Definition Multimedia Interface (HDMI) connectors, one or multiple DisplayPort connectors, or another type of display interface. The display interface 122 of the host device 104 is receptive to connection of one or multiple display devices, such as monitors, by which the host device 104 can directly provide output. The gateway device 102 emulates one or multiple such display devices, and thus acts as one or multiple virtual such display devices, via the display interface 118. The display interface 118 and the I/O interface 116 may be part of the same interface, such as a Thunderbolt connector, which is connected to a corresponding interface of the host device 104, of which the display interface 122 and the I/O interface 120 are a part.

The host device 104 includes remote desktop host software 132 that may run within or on an operating system once the operating system has booted. Like the operating system, the remote desktop host software 132 may be executed by a main or primary processor or processors of the host device 104 apart from any remote management functionality hardware of the host device 104, which may include a service processor different than the main or primary processor or processors. The remote desktop host software 132 can provide a remote desktop session 130 by which corresponding remote desktop client software 134 running on the client device 108 can remotely control the host device 104 in a software-based remote control mode.

The gateway device 102 includes and executes remote desktop proxy code 128 that can pass through the remote desktop session 130 between the host device 104 and the client device 108. The remote desktop proxy code 128 can thus send over the network interface 112 incoming network traffic from the client device 108 that relates to the remote desktop session 130. The remote desktop proxy code 128 can likewise receive over the network interface 112 outgoing network traffic from the host device 104 that relates to the remote desktop session 130.

The gateway device 102 includes and executes remote desktop host code 136 that is similar to the remote desktop host software 132. The remote desktop host code 136 provides a remote desktop session 138 corresponding to the I/O and display communication between the gateway device 102 and the host device 104, by which the remote desktop client software 134 running on the client device 108 can remotely control the host device 104 in a hardware-based remote control mode of the host device 104. The remote desktop session 138 may be in the same format (e.g., in accordance with the same protocol) as the remote desktop session 130 provided by the desktop host software 132 of the host device 132.

The remote desktop host code 136 encapsulates or encodes within the remote desktop session 138 the I/O communication between the I/O interfaces 116 and 120 and the display communication between the display interfaces 118 and 122. Specifically, the remote desktop host code 136 can receive over the I/O and display interfaces 116 and 118 outgoing I/O and display communication from the host device 104 and encapsulate or encode the communication within the remote desktop session 138. The remote desktop host code 136 can likewise decode from the remote desktop session 138 incoming I/O and display communication from the client device 108, and send the communication over the I/O and display interfaces 116 and 118.

The gateway device 102 includes and executes monitor code 124 that monitors availability of each of the hardware-based and software-based remote control modes of the host device 104. For instance, the monitor code 124 may monitor availability of the hardware-based remote control mode by monitoring whether either or both of the I/O and display interfaces 116 and 118 have active signals from their respective I/O and display interfaces 120 and 122 of the host device 104. As an example, if the host device 104 is powered on, the I/O interface 120 in the case of a USB interface may be powered and providing an active signal to the I/O interface 116, even if the operating system of the host device 104 is in a lower power mode such that the display interface 122 is not powered and not providing and active signal to the display interface 118.

The monitor code 124 may monitor availability of the software-based remote control mode by monitoring whether the host device 104 has advertised availability of a remote desktop session 130 at the network interface 114 of the host device 104 to which the network interface 112 of the gateway device 102 is connected. For example, if the operating system of the host device 104 has booted, the remote desktop host software 132 may automatically run once a user has logged into the operating system, or automatically as an operating system service. When the remote desktop host software 132 is running, the software 132 may periodically send network communication at the network interface 114 indicating that the host device 104 is remotely controllable via a remote desktop session 130. The monitor code 124 therefore can detect such network communication.

In a different implementation, the monitor code 124 may, instead of monitoring availability of the hardware-based remote control mode by monitoring the I/O and display interfaces 116 and 118, monitor such availability by receiving an indication from the remote desktop host code 136 that the host device 104 is remotely controllable over a remote desktop session 138. Similarly, the monitor code 124 may, instead of monitoring availability of the software-based remote control mode by monitoring the network interface 112, monitor such availability by receiving an indication from the remote desktop proxy code 128 that the host device 104 is remotely controllable over a remote desktop session 130. The monitor code 124 may monitor availability of the hardware- and software-based remote control modes in other ways as well.

The gateway device 102 includes and executes switch code 126 that can selectively switch remote control of the host device 104 by the client device 108 over the network 106 between the hardware- and software-based remote control modes, based on the monitored availability of each mode as provided by the monitor code 124. If the switch code 126 selects client device remote control of the host device 104 in the software-based remote control mode, the remote desktop client software 134 of the client device 108 remotely controls the host device 104 via the remote desktop session 130 passed through by the remote desktop proxy code 128. If the switch code 126 selects client device remote control of the host device 104 in the hardware-based remote control mode, the remote desktop client software 134 remotely controls the host device 104 via the remote desktop session 138 provided by the remote desktop host code 136.

The switching between the remote desktop sessions 130 and 138 may be seamless to the remote desktop client software 134 of the client device 108. The client device 108 may be unaware that it is remotely controlling the host device 104 via a remote desktop session 130 provided by the remote desktop host software 132 of the host device 104 or via a remote desktop session 138 provided by the remote desktop host code 136 of the gateway device 102. In this respect, the switch code 126 may translate the remote desktop session 130 and/or the remote desktop session 138 so that the sessions 130 and 138 may appear identical, in terms of host device network address, and so on. The switch code 126 may provide just the selected remote desktop session 130 or 138 at the network interface 110, and not the other, unselected remote desktop session 138 or 130.

The switch code 126 may switch client device remote control of the host device 104 based on the availability of the hardware- and software-based remote control modes in accordance with a policy. For example, the software-based remote control mode may be the default remote control mode. If the software-based remote control mode is unavailable, then the switch code 126 may switch client device remote control of the host device 104 to the hardware-base remote control mode, and remote control to the software-based remote control mode when it becomes available.

As another example, the switch code 126 may switch client device remote control of the host device 104 based on the availability of the hardware- and software-based remote control modes according to the particular client device 108 and/or the current user of the client device 108. For example, different client devices may default to different remote control modes. Similarly, different users may default to different remote control modes, regardless of the client devices that they are using to remotely control the host device 104, or based on the client devices that they are currently using to remote control the host device 104.

Therefore, the switch code 126 can take into account other preferences, parameters, attributes, and so on, in addition to just which remote control mode or modes are available, when switching client device remote control of the host device 104 based on the availability of the remote control modes. As an additional, concrete example, a user of the client device 108 may have a display device that supports a 60 frames-per-second (fps) frame rate, and which has what is referred to as an 8K resolution (e.g., a resolution of 7680×4320 pixels). Just one of the two remote control modes may support these attributes. Therefore, in switching client device remote control of the host device 104 based on the availability of the remote control modes, the switch code 126 can switch to the remote control mode supporting these attributes if this mode is available.

In FIG. 1B, the gateway device 102 may not include physical or hardware I/O and display interfaces 116 and 118 as it does in FIG. 1A. The host device 104 in FIG. 1B includes the remote desktop host software 132 that may run within or on an operating system once the operating system has booted, as in FIG. 1A. The remote desktop host software 132 can provide a remote desktop session 130 by which corresponding remote desktop client software 134 running on the client device 108 can remotely control the host device 104 in a software-based remote control mode. The gateway device 102 in FIG. 1B includes and executes remote desktop proxy code 128 that can pass through the remote desktop session 130 between the host device 104 and the client device 108, as in FIG. 1A.

The host device 104 in FIG. 1B further includes remote management functionality hardware 133. The hardware 133 can include a service or management processor different than the primary or main processor or processors of the device 104 that execute the operating system and the remote desktop host software 132. The hardware 133 can execute code outside the context of the operating system and even if the operating system has not booted. The hardware 133 is depicted in FIG. 1B as communicating over the same network interface 114 as the remote desktop host software 132 does, but in another implementation may communicate over a different physical or hardware network interface that may be exclusive to the hardware 133. In that case, the gateway device 102 includes another, corresponding physical or hardware network interface as well.

The remote management functionality hardware 133 can, like an external KVM device connected to I/O and display interfaces of the host device 104, provide a remote KVM session 139 in accordance with a KVM over IP or KVM over LAN technique. Corresponding remote KVM client software 135 running on the client device 108 can communicate with the host device 104 via the remote KVM session 139 as if the client device 108 were input and display devices directly connected to I/O and display interfaces of the host device 104. The remote KVM client software 135 can thus remotely control the host device 104 via the remote KVM session 139 in a hardware-based remote control mode.

The gateway device 102 also includes and executes remote KVM proxy code 137 in FIG. 1B, such as instead of remote desktop host code 136 as in FIG. 1A. The remote KVM proxy code 137 can pass through the remote KVM session 139 between the host device 104 and the client device 108. The remote KVM proxy code 137 can thus send over the network interface 112 incoming network traffic from the client device 108 that relates to the remote KVM session 139, and likewise receive over the network interface 112 outgoing network traffic from the host device 104 that relates to the remote KVM session 139.

The gateway device 102 includes and executes monitor code 124 that monitors availability of each of the hardware-based and software-based remote control modes of the host device 104. The monitor code 124 may monitor availability of the software-based remote control mode as in FIG. 1A. The monitor code 124 may monitor availability of the hardware-based remote control mode by monitoring whether the remote management functionality hardware 133 of the host device 104 has advertised availability of a remote KVM session 139 at the network interface 114 of the host device 104 to which the network interface 112 of the gateway device 102 is connected. The hardware 133 may periodically send network communication at the network interface 114 indicating that the host device 104 is remotely controllable via a remote KVM session 139, which the monitor code 124 can detect.

In a different implementation, the monitor code 124 may, instead of monitoring availability of the hardware-based remote control mode by monitoring the network interface 114 directly, monitor such availability by receiving an indication from the remote KVM proxy code 137 that the host device 104 is remotely controllable over a remote KVM session 139. The monitor code 124 may similarly monitor availability of the software-based remote control mode by receiving an indication from the remote desktop proxy code 128 that the host device 104 is remotely controllable over a remote desktop session 130. The monitor code 124 may monitor availability of the hardware- and software-based remote control modes in other ways as well.

The gateway device 102 includes and executes switch code 126 that can selectively switch remote control of the host device 104 by the client device 108 over the network 106 between the hardware- and software-based remote control modes, based on the monitored availability of each mode as provided by the monitor code 124. If the switch code 126 selects client device remote control of the host device 104 in the software-based remote control mode, the remote desktop client software 134 of the client device 108 remotely controls the host device 104 via the remote desktop session 130 passed through by the remote desktop proxy code 128, as in FIG. 1A. If the switch code 126 selects client device remote control of the host device 104 in the hardware-based remote control mode, the remote KVM client software 135 remotely controls the host device 104 via the remote KVM session 139 passed through by the remote KVM proxy code 137.

The switch code 126 may switch remote control of the host device 104 by the client device 108 between the hardware- and software-based remote control modes of the host device 104 by sending a control signal to the client device 108 over the network 106. The control signal may indicate that the remote desktop client software 134 should remotely control the host device 104 if the software-based remote control mode has been selected. The control signal may indicate that the remote KVM client software 135 should remotely control the host device 104 if the hardware-based remote control mode has been selected.

The switching between the remote desktop session 130 and the remote KVM session 139 may be seamless to the user of the client device 108. For example, the remote client software 134 may acquire focus (e.g., have its window become the active window such that input at the client device 108 is directed to the software 134) when the software-based remote control mode has been selected. Similarly, the remote KVM client software 135 may acquire focus when the hardware-based remote control mode has been selected. The switch code 126 of the gateway device 102 passes through just the selected session 130 or 139 at the network interface 110, and does not pass through the other, unselected session 139 or 130. The switch code 126 may switch client device remote control of the host device 104 based on the availability of the hardware- and software-based remote control modes as has been described in reference to FIG. 1A.

In FIG. 1C, the gateway device 102 includes the I/O and display interfaces 116 and 118 that are connected to respective I/O and display interfaces 120 and 122 as in FIG. 1A. The host device 104 in FIG. 1C again includes the remote desktop host software 132 that may run within or on an operating system once the operating system has booted. As has been described, the remote desktop host software 132 can provide a remote desktop session 130 by which corresponding remote desktop client software 134 running on the client device 108 can remotely control the host device 104 in a software-based remote control mode. The gateway device 102 in FIG. 1C also includes and executes remote desktop proxy code 128 that can pass through the remote desktop session 130 between the host device 104 and the client device 108, as in FIGS. 1A and 1B.

The gateway device 102 in FIG. 1C includes remote KVM host code 143, such as instead of remote desktop host code 136 as in FIG. 1A and/or remote KVM proxy code 137 as in FIG. 1B. The remote KVM host code 143 provides a remote KVM session 141 with respect to I/O and display communication between the gateway device 102 and the host device 104, in accordance with a KVM over IP or KVM over LAN technique. The corresponding remote KVM client software 135 running on the client device 108 can remotely control the host device 104 via the remote KVM session 141, in a hardware-based remote control mode of the host device 104.

The remote KVM host code 143 encapsulates or encodes within the remote KVM session 141 the I/O communication between the I/O interfaces 116 and 120 and the display communication between the display interfaces 118 and 122. Specifically, the remote KVM host code 143 can receive over the I/O and display interfaces 116 and 118 outgoing I/O and display communication from the host device 104 and encapsulate or encode the communication within the remote KVM session 141. The remote KVM host code 143 can likewise decode from the remote KVM session 141 incoming I/O and display communication from the client device 108, and send the communication over the I/O and display interfaces 116 and 118.

The gateway device 102 includes and executes monitor code 124 that monitors availability of each of the hardware and software-based remote control modes of the host device 104. The monitor code 124 may monitor availability of both remote control modes as in 1A. In a different implementation, the monitor code 124 may monitor availability of the hardware-based remote control mode by receiving an indication from the remote KVM host code 143 that the host device 104 is remotely controllable over a remote KVM session 141. The monitor code 124 may similarly monitor availability of the software-based remote control mode by receiving an indication from the remote desktop proxy code 128 that the host device 104 is remotely controllable over a remote desktop session 130.

The gateway device 102 includes and executes switch code 126 that can selectively switch remote control of the host device 104 by the client device 108 over the network 108 between the hardware- and software-based remote control modes, based on the monitored availability of each mode as provided by the monitor code 124. If the switch code 126 selects client device remote control of the host device 104 in the software-based remote control mode, the remote desktop client software 134 of the client device 108 remotely controls the host device 104 via the remote desktop session 130 passed through by the remote desktop proxy code 128, as in FIGS. 1A and 1B. If the switch code 126 selects client device remote control of the host device 104 in the hardware-based remote control mode, the remote desktop client software 134 remotely controls the host device 104 via the remote KVM session 141 provided by the remote KVM host code 143.

The switching between the remote desktop session 130 and the remote KVM session 139 may be seamless to the user of the client device 108. The remote client software 134 may acquire focus when the software-based remote control mode has been selected, and the KVM client software 135 may acquire focus when the hardware-based remote control mode has been selected, as in FIG. 1B. The switch code 126 of the gateway device 102 passes through just the selected session 130 or 141 at the network interface 110, and does not pass through the other, unselected session 141 or 130. The switch code 126 may switch client device remote control of the host device 104 based on the availability of the hardware- and software-based remote control modes as has been described in reference to FIG. 1A.

FIGS. 2A, 2B, and 2C show different examples of a client device 208 that can selectively switch client device remote control of a host device 204 over a network 206 between hardware-based and software-based remote control modes of the host device 204. The host device 204 may be a computer like a server, desktop, or laptop computer, or another type of computing device. The client device 208 may likewise be a computer, or another type of computing device such as a smartphone, tablet, or other type of computing device. The network 206 may be or include the Internet, an extranet, an intranet, a LAN, a WAN, or another type of network.

In FIG. 2A, a remote KVM device 202 may be in the form of a dongle or other discrete device that directly connects to the host device 204. The KVM device 202 includes a physical or hardware network interface 210 that communicatively connects to the network 206, such as via an intervening network device or devices. The client device 208 likewise has a physical or hardware network interface 240 that communicatively connects to the network 206, such as via the same or different intervening network device or devices as the KVM device 202.

The remote KVM device 202 includes a physical or hardware I/O interface 216 that is communicatively connected to an I/O interface 220 of the host device 204, such as directly without any intervening devices. The I/O interfaces 216 and 220 may each be one or multiple USB ports, one or more PS/2 ports, or another type of I/O interface. The I/O interface 220 of the host device 204 is receptive to connection of input devices by which the host device 204 can be directly provided input. The KVM device 202 emulates such input devices, and thus acts as virtual such input devices, via the I/O interface 216.

The remote KVM device 202 includes a physical or hardware display interface 218 as well, which is communicatively connected to a display interface 222 of the host device 204, such as directly without any intervening devices. The display interfaces 218 and 222 may each be one or multiple HDMI connectors, one or more DisplayPort connectors, or another type of display interface. The display interface 222 of the host device 204 is receptive to connection of one or multiple display devices by which the host device 204 can directly provide output. The KVM device 202 emulates one or multiple such display devices, and thus acts as one or multiple virtual such display devices, via the display interface 218. The interfaces 218 and 216 may be part of the same interface that is connected to a corresponding interface of the host device 204 and of which the interfaces 222 and 220 are a part.

The host device 204 includes remote desktop host software 232 that may run within or on an operating system once the operating system has booted, and which like the operating system may be executed by a main or primary processor or processors of the host device 204. The remote desktop host software 232 can provide a remote desktop session 230. The client device 208 includes and executes corresponding remote desktop code 234 that can remotely control the host device 204 via the remote desktop session 230 in a software-based remote control mode of the host device 204.

The remote KVM device 202 includes remote desktop host software 236 that is similar to the remote desktop host software 232. The remote desktop host software 236 provides a remote desktop session 238 at the network interface 210 that corresponds to the I/O and display communication between the KVM device 202 and the host device 204, by which the remote desktop code 234 can remotely control the host device 204 in a hardware-based remote control mode of the host device 204. The remote desktop session 238 may be in the same format as the remote desktop session 230.

The remote desktop host software 236 encapsulates or encodes within the remote desktop session 238 the I/O communication between the I/O interfaces 216 and 220 and the display communication between the display interfaces 218 and 222. Specifically, the remote desktop host software 236 can receive over the I/O and display interfaces 216 and 218 outgoing I/O and display communication from the host device 204 and encapsulate or encode the communication within the remote desktop session 238. The remote desktop host software 236 can likewise decode from the remote desktop session 238 incoming I/O and display communication from the client device 208, and send the communication over the I/O and display interfaces 216 and 218.

The client device 208 includes and executes monitor code 224 that monitors availability of each of the hardware-based and software-based remote control modes of the host device 204. For instance, the monitor code 224 may monitor availability of the hardware-based remote control mode by monitoring whether the remote KVM device 202 has advertised availability of a remote desktop session 238 at the network interface 210. The monitor code 224 may likewise monitor availability of the software-based remote control mode by monitoring whether the host device 204 has advertised availability of a remote desktop session 230 at the network interface 214.

The client device 208 includes and executes switch code 226 that can selectively switch remote control of the host device 204 by the remote desktop code 234 between the hardware- and software-based remote control modes, based on the monitored availability of each mode as provided by the monitor code 224. If the switch code 226 selects client device remote control of the host device 204 in the software-based remote control mode, the remote desktop code 234 remotely controls the host device 204 via the remote desktop session 230. If the switch code 226 selects client device remote control of the host device 204 in the hardware-based remote control mode, the remote desktop code 234 remotely controls the host device 204 via the remote desktop session 238.

The switching between the remote desktop sessions 230 and 238 may be seamless to the remote desktop code 234. The remote desktop code 234 may be unaware that it is remotely controlling the host device 204 via a remote desktop session 230 provided by the remote desktop host software 232 of the host device 204 or via a remote desktop session 238 provided by the remote desktop host software 236 of the remote KVM device 202. In this respect, the switch code 226 may translate the remote desktop session 230 and/or 238 so that the sessions 230 and 238 may appear identical, in terms of host device network address, and so on. The switch code 226 may provide just the selected remote desktop session 230 or 238 to the remote desktop code 234, and not the other, unselected session 238 or 230. The switch code may switch client device remote control of the host device 204 based on the availability of the hardware- and software-based remote control modes as described in reference to FIG. 1A.

In FIG. 2B, the remote KVM device 202 of FIG. 2A may be absent. The host device 204 includes the remote desktop host software 232 that may run within or on an operating system once the operating system has booted, as in FIG. 2A. The remote desktop host software 232 can provide a remote desktop session 230. The client device 208 includes and executes corresponding remote desktop program code 234 that can remotely control the host device 204 in a software-based remote control mode.

The host device 204 in FIG. 2B further includes remote management functionality hardware 233, which can include a service or management processor different than the primary or main processor or processors of the device 204 that execute the operating system and the remote desktop host software 232. The hardware 233 can execute code outside the context of the operating system and even if the operating system has not booted. The hardware 233 is depicted in FIG. 2B as communicating over the same network interface 214 as the remote desktop host software 232 does, but in another implementation may communicate over a different network interface that may be exclusive to the hardware 233.

The remote management functionality hardware 233 can provide a remote KVM session 239 in accordance with a KVM over IP or KVM over LAN technique. The client device 208 includes and executes corresponding remote KVM code 235 that can communicate with the host device 204 via the remote KVM session 239 as if the client device 208 were input and display devices directly connected to I/O and display interfaces of the host device 204. The remote KVM code 235 can thus remotely control the host device 204 via the remote KVM session 239 in a hardware-based remote control mode.

The client device 208 includes and executes monitor code 224 that monitors availability of each of the hardware-based and software-based remote control modes of the host device 204. The monitor code 224 may monitor availability of the software-based remote control mode as in FIG. 2A. The monitor code 224 may monitor availability of the hardware-based remote control mode by monitoring whether the remote management functionality hardware 233 of the host device 204 has advertised availability of a remote KVM session 239 at the network interface 214.

The client device 208 includes and executes switch code 226 that can selectively switch client device remote control of the host device 204 between the hardware- and software-based remote control modes, based on the monitored availability of each mode as provided by the monitor code 224. If the switch code 226 selects client device remote control of the host device 204 in the software-based remote control mode, the remote desktop code 234 remotely controls the host device 204 via the remote desktop session 230. If the switch code 226 selects client device remote control of the host device 204 in the hardware-based remote control mode, the remote KVM code 235 remotely controls the host device 204 via the remote KVM session 239.

The switching between the remote desktop session 230 and the remote KVM session 239 may be seamless to the user of the client device 208. For example, the switch code 226 may cause the remote program code 234 to receive focus when the software-based remote control mode has been selected. The switch code 226 may similarly cause the remote KVM code 235 to receive focus when the hardware-based remote control mode has been selected. The switch code 226 may suppress whichever of the remote desktop session 230 and the remote KVM session 239 that has not been selected so that the corresponding remote desktop code 234 or the remote KVM code 235 does not receive the unselected session. The switch code 226 may switch client device remote control of the host device 204 based on the availability of the hardware- and software-based remote control modes as has been described in reference to FIG. 1A.

In FIG. 2C, the remote KVM device 202 includes the I/O and display interfaces 216 and 218 that are connected to respective I/O and display interfaces 220 and 222 as in FIG. 2A. The KVM device 202 in FIG. 2C, however, includes remote KVM host software 243, such as instead of remote desktop host software 236 as in FIG. 2A. The remote KVM host software 243 provides a remote KVM session 241 with respect to I/O and display communication between the KVM device 202 and the host device 204, in accordance with a KVM over IP or KVM over LAN technique. The client device 208 includes and executes remote KVM code 235 that can remotely control the host device 204 via the remote KVM session 241, in a hardware-based remote control mode of the host device 204.

The remote KVM host software 243 encapsulates or encodes within the remote KVM session 241 the communication between the I/O interfaces 216 and 220 and between the display interfaces 218 and 222. Specifically, the remote KVM host software 243 can receive over the I/O and display interfaces 216 and 218 outgoing communication from the host device 204 and encapsulate or encode the communication with the remote KVM session 241. The remote KVM host software 243 can likewise decode from the remote KVM session 241 incoming communication from the client device 208, and send the communication over the interfaces 216 and 218.

The client device 208 includes and executes monitor code 224 that monitors availability of each of the hardware and software-based remote control modes of the host device 204. The monitor code 224 may monitor availability of the software-based remote control mode as in FIG. 2A. The monitor code 224 may monitor availability of the hardware-based remote control mode by monitoring whether the remote KVM host software 243 of the remote KVM device 202 has advertised availability of a remote KVM session 241 at the network interface 210.

The client device 208 includes and executes switch code 226 that can selectively switch client device remote control of the host device 204 between the hardware- and software-based remote control modes, based on the monitored availability of each mode as provided by the monitor code 224. If the switch code 226 selects client device remote control of the host device 204 in the software-based remote control mode, the remote desktop code 234 remotely controls the host device 204 via the remote desktop session 230. If the switch code 226 selects client device remote control of the host device 204 in the hardware-based remote control mode, the remote KVM code 235 remotely controls the host device 204 via the remote KVM session 241.

The switching between the remote desktop session 230 and the remote KVM session 239 may be seamless to the user of the client device 208. For example, the switch code 226 may cause the remote program code 234 to receive focus when the software-based remote control mode has been selected, and may cause the remote KVM code 235 to receive focus when the hardware-based remote control mode has been selected, as in FIG. 2B. Also as in FIG. 2B, the switch code 226 may suppress whichever session 230 or 239 that has not been selected so that the corresponding remote desktop code 234 or the remote KVM code 235 does not receive the unselected session. The switch code 226 may switch client device remote control of the host device 204 based on the availability of the hardware- and software-based remote control modes as has been described in reference to FIG. 1A.

Figure 3A:
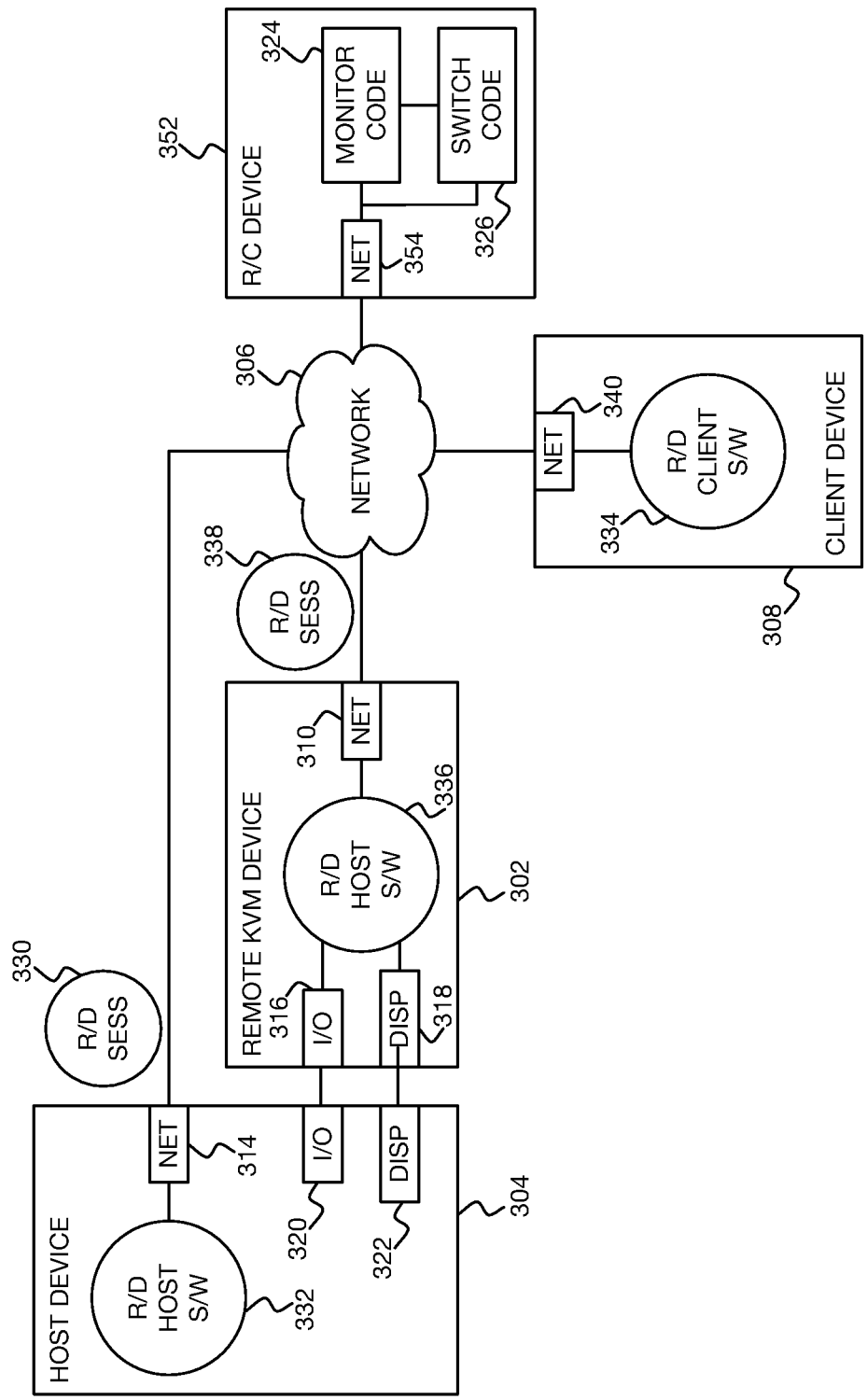

FIGS. 3A, 3B, and 3C show different examples of a remote control device 352 that can selectively switch client device remote control of a host device 304 by a client device 308 over a network 306 between hardware-based and software-based remote control modes of the host device 304. The host device 304 may be a computer like a server, desktop, or laptop computer, or another type of computing device. The client device 308 may likewise be a computer, or another type of computing device such as a smartphone, tablet, or other type of computing device. The remote control device 352 may also be a computer like a server, desktop, or laptop computer, or another type of computing device, or may be a network device, such as a router, switch, firewall, and so on. The network 306 may be or include the Internet, an extranet, an intranet, a LAN, a WAN, or another type of network.

In FIG. 3A, a remote KVM device 302 may be in the form of a dongle or other discrete device that directly connects to the host device 304. The KVM device 302 includes a physical or hardware network interface 310 that communicatively connects to the network 306, such as via an intervening network device or devices. The client device 308 likewise has a physical or hardware network interface 340 that communicatively connects to the network 306, such as via the same or different intervening network device or devices as the KVM device 302. The remote control device 352 also has a physical or hardware network interface 354 that communicatively connects to the network 306, such as via the same or different intervening network device or devices as the KVM device 302 and/or the client device 308.

The remote KVM device 302 includes a physical or hardware I/O interface 316 that is communicatively connected to an I/O interface 320 of the host device 304, such as directly without any intervening devices. The I/O interfaces 316 and 320 may each be one or multiple USB ports, one or more PS/2 ports, or another type of I/O interface. The I/O interface 320 of the host device 304 is receptive to connection of input devices by which the host device 204 can be directly provided input. The KVM device 302 emulates such input devices, and thus acts as virtual such input devices, via the I/O interface 316.

The remote KVM device 302 includes a physical or hardware display device 318 as well, which is communicatively connected to a display interface 322 of the host device 304, such as directly without any intervening devices. The display interfaces 318 and 322 may each be one or multiple HDMI connectors, one or more DisplayPort connectors, or another type of display interface. The display interface 322 of the host device 304 is receptive to connection of one or multiple display devices by which the host device 304 can directly provide output. The KVM device 302 emulates one or multiple such display devices, and thus acts as one or multiple virtual such display devices, via the display interface 318. The interfaces 318 and 316 may be part of the same interface that is connected to a corresponding interface of the host device 304 and of which the interfaces 322 and 320 are a part.

The host device 304 includes remote desktop host software 332 that may run within or on an operating system once the operating system has booted, and which like the operating system may be executed by a main or primary processor or processors of the host device 304. The remote desktop host software 332 can provide a remote desktop session 330. The client device 308 includes and executes corresponding remote desktop client software 334 that can remotely control the host device 304 via the remote desktop session 330 in a software-based remote control mode of the host device 304.

The remote KVM device 302 includes remote desktop host software 336 that is similar to the remote desktop host software 332. The remote desktop host software 336 provides a remote desktop session 338 at the network interface 310 that corresponds to the I/O and display communication between the gateway device 302 and the host device 304, by which the remote desktop client software 334 can remotely control the host device 304 in a hardware-based remote control mode of the host device 304. The remote desktop session 338 may be in the same format as the remote desktop session 330.

The remote desktop host software 336 encapsulates or encodes within the remote desktop session 338 the I/O communication between the I/O interfaces 316 and 320 and the display communication between the display interfaces 318 and 322. Specifically, the remote desktop host software 336 can receive over the I/O and display interfaces 316 and 318 outgoing I/O and display communication from the host device 304 and encapsulate or encode the communication within the remote desktop session 338. The remote desktop host software 336 can likewise decode from the remote desktop session 338 incoming I/O and display communication from the client device 308, and send the communication over the I/O and display interfaces 316 and 318.

The remote control device 352 includes and executes monitor code 324 that monitors availability of each of the hardware-based and software-based remote control modes of the host device 304. For instance, the monitor code 324 may monitor availability of the hardware-based remote control mode by monitoring whether the remote KVM device 302 has advertised availability of a remote desktop session 338 at the network interface 310. The monitor code 324 may likewise monitor availability of the software-based remote control mode by monitoring whether the host device 304 has advertised availability of a remote desktop session 330 at the network interface 314.

The remote control device 352 includes and executes switch code 326 that can selectively switch remote control of the host device 304 by the remote desktop software 334 between the hardware- and software-based remote control modes, based on the monitored availability of each mode as provided by the monitor code 324. If the switch code 326 selects client device remote control of the host device 304 in the software-based remote control mode, the remote desktop client software 334 remotely controls the host device 304 via the remote desktop session 330. If the switch code 326 selects client device remote control of the host device 304 in the hardware-based remote control mode, the remote desktop client software 334 remotely controls the host device 304 via the remote desktop session 338.

The switch code 326 may switch remote control of the host device 304 by the client device 308 between the hardware- and software-based remote control modes of the host device 304 by sending a control signal to the client device 308 over the network 306. The control signal may indicate to the remote desktop client software 334 via which remote desktop session 338 or 330 the client software 334 should remotely control the host device 304. The control signal may indicate the network address of the remote KVM desktop device 302 if the hardware-based remote control mode has been selected, and may indicate the network address of the host device 304 if the software-based remote control mode has been selected. The switch code may switch client device remote control of the host device 204 based on the availability of the hardware- and software-based remote control modes as described in reference to FIG. 1A.

In another implementation, switching between the remote desktop sessions 330 and 338 may be seamless to the remote desktop code 234. The remote desktop client software 334 may communicatively connect to the remote control device 352 over the network 306 instead of to the host device 304 to remotely control the host device 304. The remote desktop client software 334 may thus be unaware that it is remotely controlling the host device 304 via a remote desktop session 330 provided by the remote desktop host software 332 of the host device 304 or via a remote desktop session 338 provided by the remote desktop host software 336 of the remote KVM device 202. The switch code 326 may translate the remote desktop session 330 and/or 338 so that the sessions 330 and 338 may appear identical. The switch code 226 may provide just the selected remote desktop session 230 or 238 to the remote desktop code 234, and not the other, unselected session 238 or 230.

In FIG. 3B, the remote KVM device 302 of FIG. 3A may be absent. The host device 304 includes the remote desktop host software 332 that may run within or on an operating system once the operating system has booted, as in FIG. 3A. The remote desktop host software 332 can provide a remote desktop session 330. The client device 308 includes and executes corresponding remote desktop client software 334 that can remotely control the host device 304 in a software-based remote control mode.

The host device 304 in FIG. 3B further includes remote management functionality hardware 333, as in FIG. 2B. The remote management functionality hardware 233 can provide a remote KVM session 339 in accordance with a KVM over IP or KVM over LAN technique, also as in FIG. 2B. The client device 308 includes and executes corresponding remote KVM client software 335 that can communicate with the host device 304 via the remote KVM session 339 as if the client device 308 were input and display devices directly connected to I/O and display interfaces of the host device 304. The remote KVM client software 335 can thus remotely control the host device 304 via the remote KVM session 339 in a hardware-based remote control mode.

The remote control device 352 includes and executes monitor code 324 that monitors availability of each of the hardware-based and software-based remote control modes of the host device 304. The monitor code 324 may monitor availability of the software-based remote control mode as in FIG. 3A. The monitor code 324 may monitor availability of the hardware-based remote control mode by monitoring whether the remote management functionality hardware 333 of the host device 304 has advertised availability of a remote KVM session 339 at the network interface 314, as in FIG. 2B.

The remote control device 352 includes and executes switch code 326 that can selectively switch client device remote control of the host device 304 between the hardware- and software-based remote control modes, based on the monitored availability of each mode as provided by the monitor code 324. If the switch code 326 selects client device remote control of the host device 304 in the software-based remote control mode, the remote desktop client software 334 remotely controls the host device 304 via the remote desktop session 330. If the switch code 326 selects client device remote control of the host device 304 in the hardware-based remote control mode, the remote KVM client software 335 remotely controls the host device 204 via the remote KVM session 239.

The switch code 326 may switch remote control of the host device 304 by the client device 308 between the hardware- and software-based remote control modes of the host device 304 by sending a control signal to the client device 308 over the network 306. The control signal may indicate that the remote desktop client software 334 should remotely control the host device 304 if the software-based remote control mode has been selected. The control signal may indicate that the remote KVM client software 335 should remotely control the host device 304 if the hardware-based remote control mode has been selected.

The switching between the remote desktop session 330 and the remote KVM session 339 may be seamless to the user of the client device 308. For example, the remote client software 334 may acquire focus (e.g., have its window become the active window such that input at the client device 308 is directed to the software 334) when the software-based remote control mode has been selected. Similarly, the remote KVM client software 335 may acquire focus when the hardware-based remote control mode has been selected. The switch code 326 may switch client device remote control of the host device 304 based on the availability of the hardware- and software-based remote control modes as has been described in reference to FIG. 1A.

In FIG. 3C, the remote KVM device 302 includes the I/O and display interfaces 316 and 318 that are connected to respective I/O and display interfaces 320 and 322 as in FIG. 3A. The KVM device 302 in FIG. 3C, however, includes remote KVM host software 343, such as instead of remote desktop host software 336 as in FIG. 3A. The remote KVM host software 343 provides a remote KVM session 341 with respect to I/O and display communication between the KVM device 302 and the host device 304, in accordance with a KVM over IP or KVM over LAN technique, as in FIG. 2C. The client device 308 includes and executes remote KVM client software 335 that can remotely control the host device 304 via the remote KVM session 341, in a hardware-based remote control mode of the host device 304. The remote KVM host software 343 encapsulates or encodes within the remote KVM session 341 the communication between the I/O interfaces 316 and 320 and between the display interfaces 318 and 322, as in FIG. 2C.

The remote control device 352 includes and executes monitor code 324 that monitors availability of each of the hardware and software-based remote control modes of the host device 304. The monitor code 324 may monitor availability of the software-based remote control mode in reference to FIG. 3A. The monitor code 324 may monitor availability of the hardware-based remote control mode by monitoring whether the remote KVM host software 343 of the remote KVM device 302 has advertised availability of a remote KVM session 341 at the network interface 310.

The remote control device 352 includes and executes switch code 326 that can selectively switch client device remote control of the host device 304 between the hardware- and software-based remote control modes, based on the monitored availability of each mode as provided by the monitor code 324. If the switch code 326 selects client device remote control of the host device 304 in the software-based remote control mode, the remote desktop client software 334 remotely controls the host device 304 via the remote desktop session 330. If the switch code 326 selects client device remote control of the host device 304 in the hardware-based remote control mode, the remote KVM client software 335 remotely controls the host device 304 via the remote KVM session 341.

The switch code 326 may switch remote control of the host device 304 by the client device 308 between the hardware- and software-based remote control modes of the host device 304 by sending a control signal to the client device 308 over the network 306. The control signal may indicate that the remote desktop client software 334 should remotely control the host device 304 if the software-based remote control mode has been selected. The control signal may indicate that the remote KVM client software 335 should remotely control the host device 304 if the hardware-based remote control mode has been selected.

The switching between the remote desktop session 330 and the remote KVM session 341 may be seamless to the user of the client device 308. For example, the remote client software 334 may acquire focus (e.g., have its window become the active window such that input at the client device 308 is directed to the software 334) when the software-based remote control mode has been selected. Similarly, the remote KVM client software 335 may acquire focus when the hardware-based remote control mode has been selected. The switch code 326 may switch client device remote control of the host device 304 based on the availability of the hardware- and software-based remote control modes as has been described in reference to FIG. 1A.

Figure 4A:
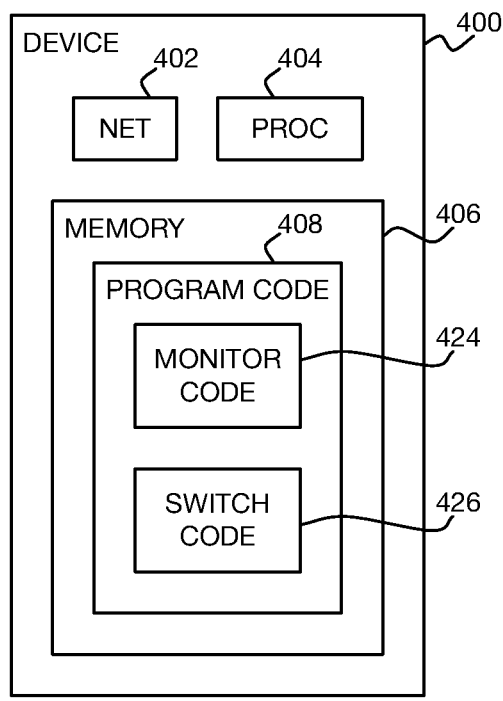
FIG. 4A is a diagram of an example device that can selectively switch client device remote control of a host device between hardware-based and software-based remote control modes of the host device.

FIG. 4A shows an example device 400 that can selectively switch client device remote control of a host device between hardware-based and software-based remote control modes of the host device. The device 400 may be the gateway device 102 of FIGS. 1A-1C, the client device 208 of FIGS. 2A-2C, or the remote control device 352 of FIGS. 3A-3C. The device 400 includes a network interface 402 to communicatively connect to a host device having a hardware-based remote control mode and a software-based remote control mode. The network interface 402 may be the network interface 112 of FIGS. 1A-1C, the network interface 240 of FIGS. 2A-2C, or the network interface 354 of FIGS. 3A-3C.

The device 400 includes a processor 404 and a memory 406 storing program code 408 executable by the processor 404. The program code 408 includes monitor code 424, such as the monitor code 124 of FIGS. 1A-1C, the monitor code 224 of FIGS. 2A-2C, or the monitor code 324 of FIGS. 3A-3C. The monitor code 424 monitors availability of each of the hardware- and software-based remote control modes. The program code 408 includes switch code 426, such as the switch code 126 of FIGS. 1C-1C, the switch code 226 of FIGS. 2A-2C, or the switch code 326 of FIGS. 3A-3C. The switch code 426 selectively switches client device remote control of the host device between the hardware- and software-based remote control modes, based on the monitored availability of each remote control mode.

Figure 4B:
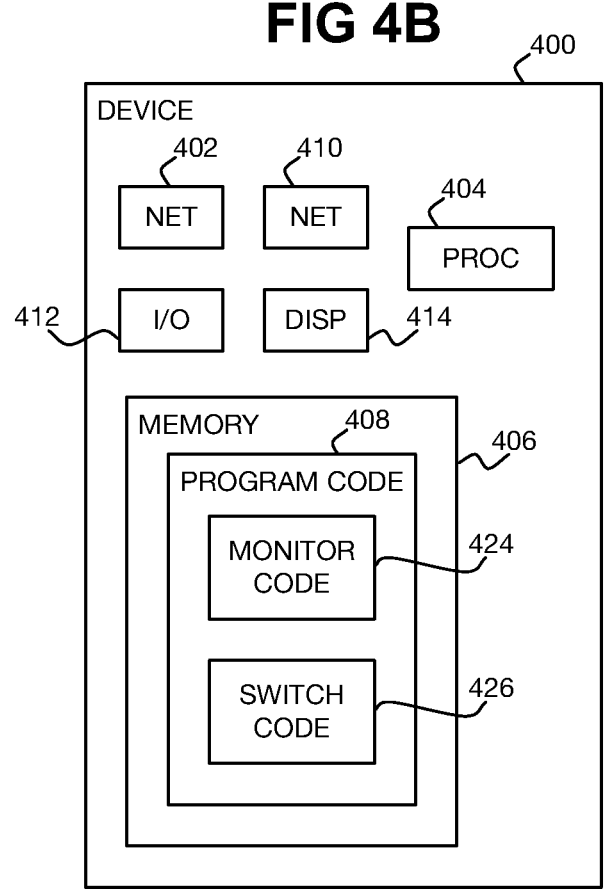
FIG. 4B is a diagram of an example gateway device that can selectively switch client device remote control of a host device between hardware-based and software-based remote control modes of the host device.

FIG. 4B shows the example device 400 in an implementation in which the device 400 is a gateway device, such as the gateway device 102 of FIGS. 1A-1C. The device 400 again includes the network interface 402, the processor 404, and the memory 406 storing the program code 408 that includes the monitor code 424 and the switch code 426. The device 400 also includes a network interface 410, such as the network interface 110 of FIGS. 1A-1C, to communicatively connect to a client device over a network. The device 400 may also include an I/O interface 412, such as the I/O interface 116 of FIGS. 1A and 1C, to connect to an I/O interface of the host device. The device 400 may include as a display interface 414, such as the display interface 118 of FIGS. 1A and 1C, to connect to a display interface of the host device.

Figure 5A:
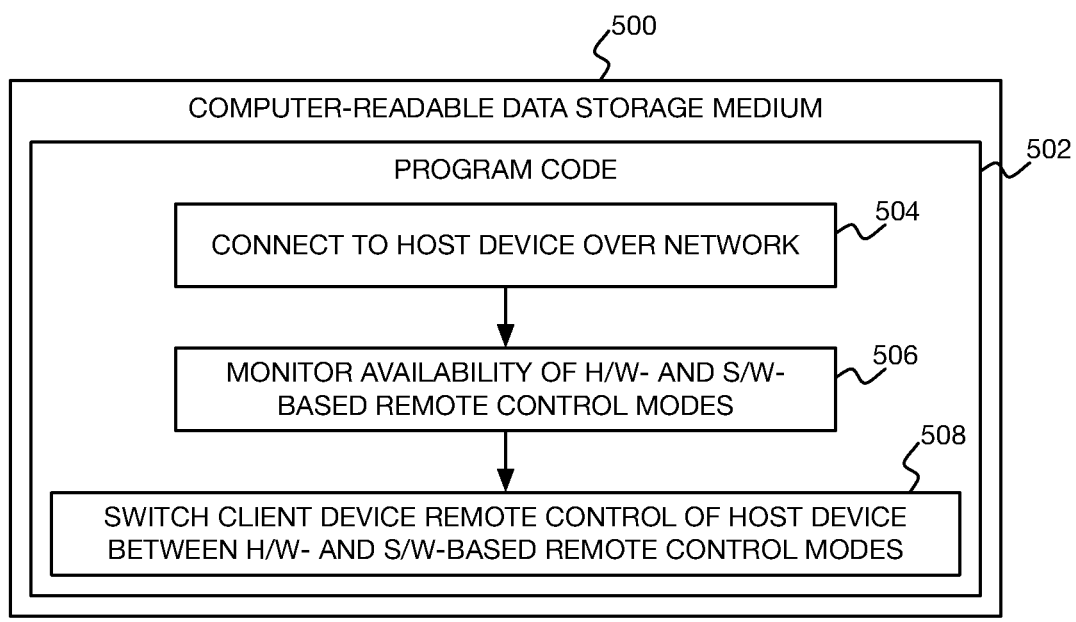
FIG. 5A is a diagram of an example non-transitory computer-readable data storage medium storing program code that is executable by a device to switch client device remote control of a host device between hardware-based and software-based remote control modes of the host device.

FIG. 5A is a diagram of an example non-transitory computer-readable data storage medium 500 storing program code 502 that is executable by a device to switch client device remote control of a host device between hardware-based and software-based remote control modes of the host device. The device that executes the program code 502 may be the gateway device 102 of FIGS. 1A-1C, the client device

208 of FIGS. 2A-2C, or the remote control device 352 of FIGS. 3A-3C. The device executes the program code 502 to perform processing.

The processing includes communicatively connecting over a network to a host device having a hardware-based remote control mode and a software-based remote control mode (504). The processing includes monitoring availability of each of the hardware- and software-based remote control modes (506). The processing includes selectively switching client device remote control of the host device between the hardware- and software-based remote control modes, based on the monitored availability of each remote control mode (508).

Figure 5B:
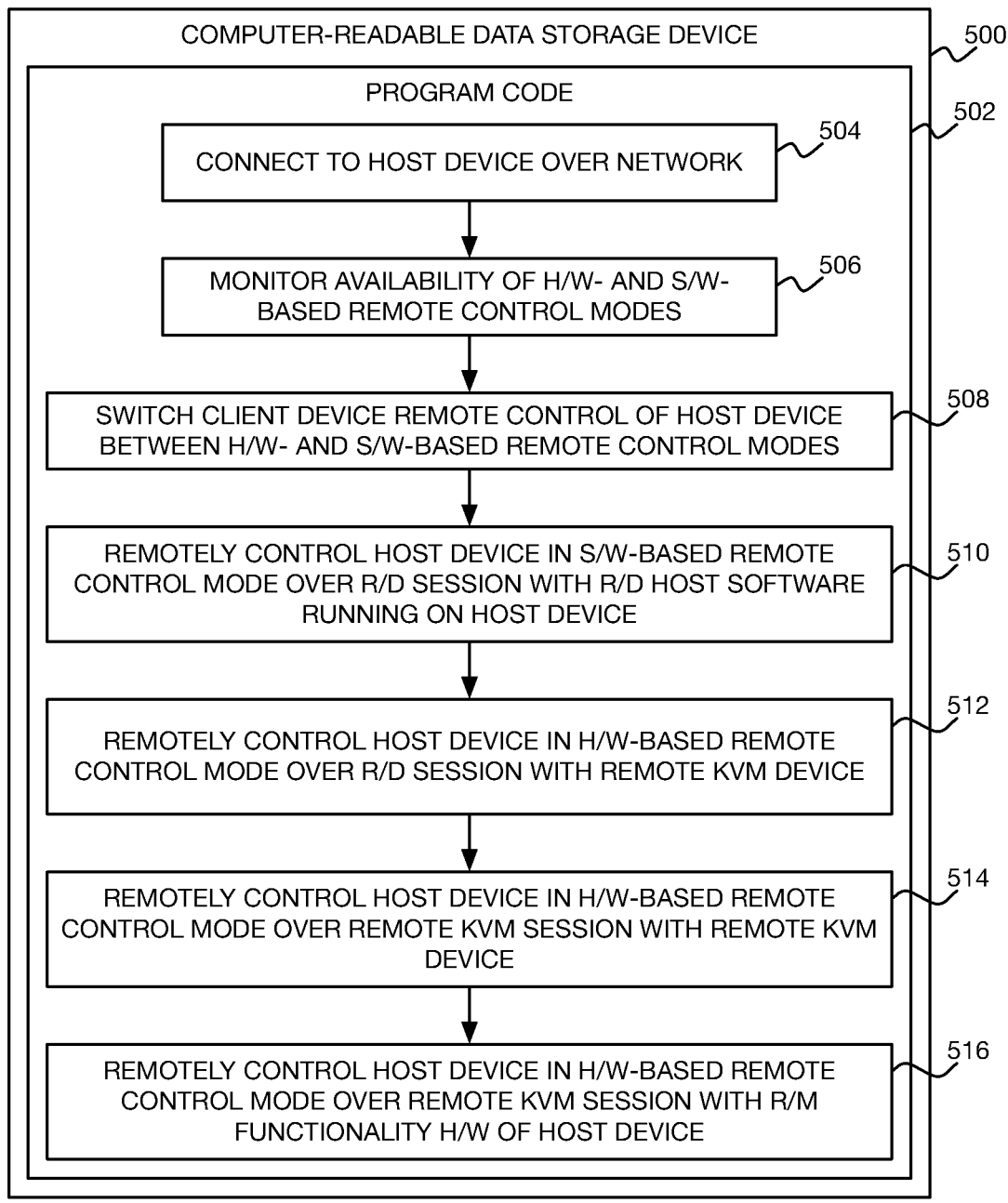
FIG. 5B is a diagram of an example non-transitory computer-readable data storage medium storing program code that is executable by a client device to switch client device remote control of a host device between hardware-based and software-based remote control modes of the host device.

FIG. 5B shows the example non-transitory computer-readable data storage medium in an implementation in which the program code 502 is executed by a client device, such as the client device 208 of FIGS. 2A-2C, to perform processing. The processing again includes the processing of parts 504, 506, and 508. The processing also includes remotely controlling the host device in the software-based remote control mode over a remote desktop session with remote desktop host software running on the host device (510), as in FIGS. 2A-2C.

The processing can include remotely controlling the host device in the hardware-based remote control mode over a remote desktop session with a remote KVM device (512), as in FIG. 2A. The processing can additionally or instead include remotely controlling the host device in the hardware-based remote control mode over a remote KVM session with a remote KVM device (514), as in FIG. 2C. The processing can additionally or instead include remotely controlling the host device in the hardware-based remote control mode over a remote KVM session with remote management functionality hardware of the host device (516), as in FIG. 2B.

FIG. 6A shows an example method 600 that is performed by a device to switch client device remote control of a host device between hardware-based and software-based remote control modes of the host device. The device that performs the method 600 may be the gateway device 102 of FIGS. 1A-1C, the client device 208 of FIGS. 2A-2C, or the remote control device 352 of FIGS. 3A-3C. The method 600 includes communicatively connecting to a host device over a network (602). The host device has a hardware-based remote control mode and a software-based remote control mode. The method 600 includes monitoring availability of each of the hardware- and software-based remote control modes (604). The method 600 includes selectively switching client device remote control of the host device between the hardware- and software-based remote control modes, based on the monitored availability of each remote control mode (606).

FIG. 6B shows the example method 600 in an implementation in which the method 600 is performed by a remote control device, such as the remote control device 352 of FIGS. 3A-3C. The method 600 includes communicatively connecting to a host device over a network (602). The method 600 includes monitoring availability of each of the hardware- and software-based remote control modes (604), and selectively switching client device remote control of the host device between the hardware- and software-based remote control modes, based on the monitored availability of each remote control mode (606).

The method 600 can include monitoring availability of the hardware- and software-based remote control modes in part 604 as follows. The availability of the software-based remote control mode may be monitored by monitoring availability of a remote desktop session with remote desktop host software running on the host device (612), as in FIGS. 3A-3C. The availability of the hardware-based remote control mode may be monitored by monitoring availability of a remote KVM session with a remote KVM device or with remote management functionality hardware of the host device (614), as in FIGS. 3C and 3B, respectively. The availability of the hardware-based remote control mode may additionally or instead be monitored by monitoring availability of a remote desktop session with a remote KVM device (616), as in FIG. 3A.

Techniques have been described for selectively switching remote control device remote control of a host device between hardware-based and software-based remote control modes, based on monitoring of the availability of each remote control mode. The monitoring and switching functionality may reside at a gateway device connected to the host device, at the client device itself, or at a remote control device other than a remote KVM device, the client device, or the host device. Switching between the remote control modes may be seamless to the client device and/or to the user of the client device.

We claim:

1. A device comprising:
   a network interface to communicatively connect to a host device having a hardware-based remote control mode and a software-based remote control mode;
   a processor; and
   a memory storing program code executable by the processor and comprising:
   monitor code to monitor availability of each of the hardware- and software-based remote control modes by monitoring input signals received from the host device via the network interface; and
   switch code to selectively switch client device remote control of the host device between the hardware- and software-based remote control modes, based on the monitored availability of each remote control mode.

2. The device of claim 1, wherein the network interface is host-facing network interface connected to a network interface of the host device, the device further comprising:
   a network-facing network interface to communicatively connect to a client device over a network.

3. The device of claim 2, further comprising:
   an input/output (I/O) interface to connect to an I/O interface of the host device; and
   a display interface to connect to a display interface of the host device,
   wherein the program code further comprises:
   remote desktop proxy code to, for client device remote control of the host device in the software-based remote control mode, pass through a remote desktop session between remote desktop host software running on the host device and remote desktop client software running on the client device; and
   remote desktop host code to, for client device remote control of the host device in the hardware-based remote control mode, provide a remote desktop session to the remote desktop client software running on the client device corresponding to I/O and display communication with the host device over the I/O and display interfaces.

4. The device of claim 2, further comprising:
   an input/output (I/O) interface to connect to an I/O interface of the host device; and
   a display interface to connect to a display interface of the host device, wherein the program code further comprises:
remote desktop proxy code to, for client device remote control of the host device in the software-based remote control mode, pass through a remote desktop session between remote desktop host software running on the host device and remote desktop client software running on the client device; and
keyboard-video-mouse (KVM) host code to, for client device remote control of the host device in the hardware-based remote control mode, provide a remote KVM session with respect to I/O and display communication with the host device over the I/O and display interfaces.

5. The device of claim 2, wherein both the hardware- and software-based remote control modes are accessible over the network interface of the host device, the program code further comprising:
remote desktop proxy code to, for client device remote control of the host device in the software-based remote control mode, pass through a remote desktop session between remote desktop host software running on the host device and remote desktop client software running on the client device; and
keyboard-video-mouse (KVM) proxy code to, for client device remote control of the host device in the hardware-based remote control mode, pass through a remote KVM session between remote management functionality hardware of the host device and remote KVM client software running on the client device.

6. A non-transitory computer-readable data storage medium storing program code executable by a device to perform processing comprising:
communicatively connecting over a network to a host device having a hardware-based remote control mode and a software-based remote control mode;
monitoring availability of each of the hardware- and software-based remote control modes by monitoring input signals received from the host device via a network interface; and
selectively switching client device remote control of the host device between the hardware- and software-based remote control modes, based on the monitored availability of each remote control mode.

7. The non-transitory computer-readable data storage medium of claim 6, wherein the device is a client device, the processing further comprising:
remotely controlling the host device in the software-based remote control mode over a remote desktop session with remote desktop host software running on the host device.

8. The non-transitory computer-readable data storage medium of claim 6, wherein the device is a client device, the processing further comprising:
remotely controlling the host device in the hardware-based remote control mode over a remote desktop session with a remote keyboard-video-mouse (KVM) device having input/output (I/O) and display interfaces respectively connected to I/O and display interfaces of the host device.

9. The non-transitory computer-readable data storage medium of claim 6, wherein the device is a client device, the processing further comprising:
remotely controlling the host device in the hardware-based remote control mode over a remote keyboard-video-mouse (KVM) session with a remote KVM device having input/output (I/O) and display interfaces respectively connected to I/O and display interfaces of the host device.

10. The non-transitory computer-readable data storage medium of claim 6, wherein the device is a client device, the program code executable by the device to:
remotely controlling the host device in the hardware-based remote control mode over a remote KVM session with remote management functionality hardware of the host device.

11. The device of claim 1, wherein the input signals are further received from an input-output (IO) interface of the device, the IO interface communicatively coupled with the host device.

12. A method comprising:
communicatively connecting, by a device, to a host device over a network, the host device having a hardware-based remote control mode and a software-based remote control mode;
monitoring, by the device, availability of each of the hardware- and software-based remote control modes by monitoring input signals received from the host device via a network interface; and
selectively switching, by the device, client device remote control of the host device between the hardware- and software-based remote control modes, based on the monitored availability of each remote control mode.

13. The method of claim 12, further comprising:
communicatively connecting by the device, to a client device over the network, the client device remotely controlling the host device in the hardware- and software-based control modes.

14. The method of claim 13, wherein monitoring the availability of each of the hardware- and software-based remote control modes comprises:
monitoring the availability of the software-based remote control mode by monitoring availability of a remote desktop session with remote desktop host software running on the host device.

15. The method of claim 13, wherein monitoring the availability of each of the hardware- and software-based remote control modes comprises:
monitoring the availability of the hardware-based remote control mode by monitoring availability of a remote keyboard-video-mouse (KVM) session with remote management functionality hardware of the host device or with a remote KVM device having input/output (I/O) and display interfaces respectively connected to I/O and display interfaces of the host device.

16. The method of claim 13, wherein monitoring the availability of each of the hardware- and software-based remote control modes comprises:
monitoring the availability of the hardware-based remote control mode by monitoring availability of a remote desktop session with a remote KVM device having input/output (I/O) and display interfaces respectively connected to I/O and display interfaces of the host device.

17. The device of claim 11, wherein the input signals received via the network interface indicates the availability of the software-based remote control mode, and wherein the input signals received via the IO interface indicates the availability of the hardware-based remote control mode.

* * * * *